Figure 1:
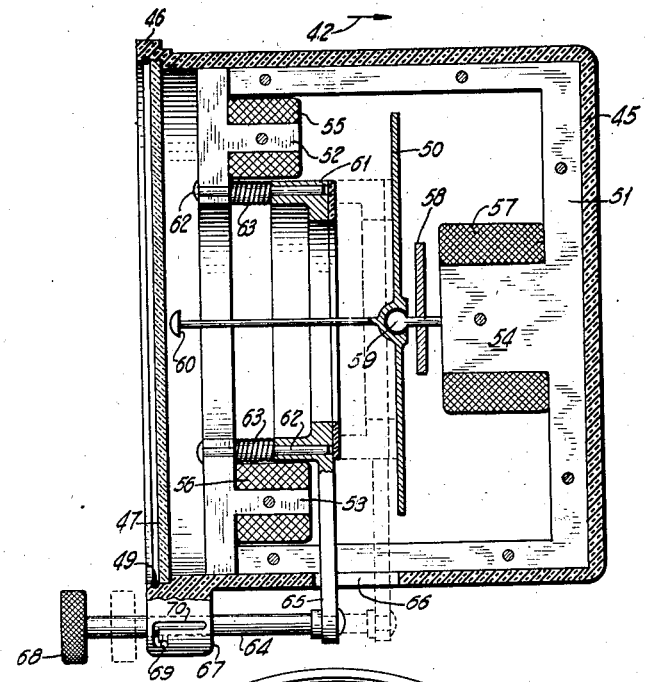

June 18, 1935.  C. MARCUS  2,005,379

AIRCRAFT DEVIATION INDICATOR

Filed May 9, 1932

INVENTOR.
CHARLES MARCUS
BY Stephen Cerstvik.
ATTORNEY.

Patented June 18, 1935

2,005,379

UNITED STATES PATENT OFFICE 2,005,379

AIRCRAFT DEVIATION INDICATOR

Charles Marcus, New York, N. Y., assignor, by mesne assignments, to Eclipse Aviation Corporation, East Orange, N. J., a corporation of New Jersey Application May 9, 1932, Serial No. 610,303

5 Claims. (Cl. 33—204)

The present invention relates to indicating devices, and more particularly to an instrument for indicating the attitude of an aircraft with respect to two of its axes while the craft is in flight.

The device embodying the invention comprises an indicator or pointer carried by a gyroscopic device having three degrees of freedom and rotated about an axis parallel to the longitudinal axis of the craft and arranged to be actuated upon movement of the craft about two of its axes at right angles to each other.

More specifically, the instrument embodying the present invention is for the purpose of indicating the pitching and turning of an aircraft by means of a single pointer. Such instruments are generally known in the art as deviometers or deviation indicators and, heretofore, in devices of this type the gyroscope has been provided with an air-drive of either the suction or pressure type. Although such air-drives are suitable for certain installations, it is necessary to provide additional mechanisms for producing air suction or air pressure for driving the gyroscope. In accordance with the present invention, such an air-drive is eliminated and the instrument is made more compact by providing an electric motor for driving the gyroscope, which is a gliding field induction motor of the watt-hour meter type having a rotor constituted by a disc mounted for rotation in a universal support and positioned on an axis coinciding with or parallel to the longitudinal axis of the aircraft. Accordingly, one of the objects of the invention is to provide a deviation indicator embodying a novel electrical drive for the gyroscopic element thereof.

Another object is to provide a novel deviation indicator of the class described embodying a novel electric motor the rotor of which constitutes a universally supported gyroscopic element mounted between a plurality of fixed coils.

Another object of the invention is to provide in a deviation indicator embodying a universally supported gyroscopic element, novel electrical driving means for the latter of the induction watt-hour meter type.

The above and other objects and advantages of the invention will appear more fully hereinafter from a consideration of the detailed description which follows, taken together with the accompanying drawing, wherein is illustrated one embodiment of the invention. It is to be expressly understood, however, that said drawing is for the purpose of illustration and description only, and is not designed as a definition of the limits of the invention, reference being had for this purpose to the appended claims.

Figure 2:
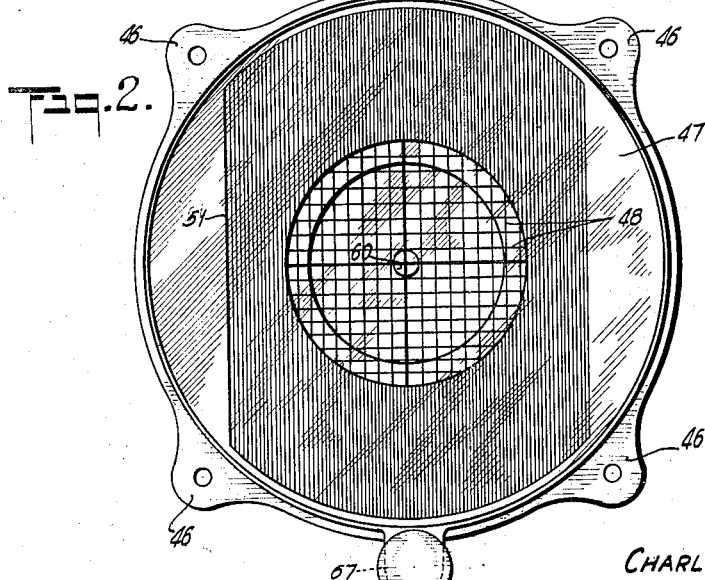

In the drawing, wherein like reference characters refer to like parts throughout the several views, Fig. 1 is a longitudinal section of one form of instrument embodying the present invention;

Fig. 2 is a front view of the instrument of Fig. 1 showing the relation of the pointer and dial in normal position;

Referring to the drawing, there is shown one form of instrument embodying the present invention in which the drive of the gyroscopic element is constituted by an electric motor of the gliding field or induction watt-hour meter type such, for example, as is disclosed on page 1917 of Pender's Handbook for Electrical Engineers, 2nd edition, published by John Wiley & Sons, New York. In the embodiment illustrated, the deviometer comprises a casing 45 having at the front end thereof several lugs or ears 46 for mounting the casing on an instrument panel and the front end of the casing is provided with a cover-glass 47 having horizontal and vertical cross-lines 48 etched or marked in any suitable manner in the central portion thereof. The cover-glass is secured to the casing by means of a clamping ring 49. The gyroscopic element in the present instance is constituted by a metal disc 50 which comprises the armature disc of a gliding field induction motor of the watt-hour meter type. The motor includes a laminated soft iron core 51, having formed thereon a plurality of pole pieces, 52, 53, and 54 on which are wound current coils 55 and 56 and a voltage coil 57, respectively. The current windings 55 and 56 consist of a few turns of coarse wire and are wound or connected so that their magnetic fields are in opposed relation. They are energized by an alternating current at low voltage from any suitable source (not shown). The potential coil 57 is highly inductive so that the flux thereof will lag the voltage by approximately 90 degrees; that is, the flux is approximately in quadrature with the voltage, and the flux, due to the current coils, is in phase with the load current. The disc 50 is interposed between the pole 54 and the poles 52 and 53 so that it is cut by the alternating flux due to each of the windings. There are thus set up in the disc 50, current which flow about each pole in approximately concentric circles, the induced currents due to the two windings being in quadrature for a load of unity power factor. Part of the current induced by the current coils passes under the pole of the potential coil and therefore through a magnetic field which is approximately in phase with this current, and similarly, part of the current induced by the potential coil passes under the pole of the current coil and therefore through a magnetic field approximately in phase with it; for power factors less than unity the phase difference between these currents and the magnetic fields through which they pass is the same as the difference in phase between the load current and the voltage. Hence a torque is produced on the disc 50 having an average value proportional to the load supplied to the windings, thereby causing the disc to rotate. A rectangular metal punching 58 is provided in front of the potential coil 57 to produce the flux displacement therefrom, which is necessary so that the flux acting on the disc 50 may give the latter the necessary torque to spin it at the proper speed. The disc 50 is journaled on a universal bearing 59 carried by and rigidly secured to the pole pieces 54 and has secured thereto or formed integral therewith a pointer 60 so that upon inclination of the casing 45 upward when the craft is flying in the direction of the arrow 42, there will be a relative upward inclination of the pointer 60 with respect to the casing 45. Also, upon a turn of the aircraft to the left or to the right, the pointer 60 will move correspondingly to the left or to the right. The relative movement of the pointer 60 may then be observed from the front of the instrument through the cover-glass 47, whereby the attitude of the craft may then be noted.

It is desirable that the pointer 60 be capable of being returned to its normally central position after an indication has been produced and for this purpose novel means are provided whereby upon actuation thereof said pointer is immediately centralized. Said means, in the form shown, comprise a collar 61 slidably mounted on a plurality of pins 62 which engage the collar at points circumferentially spaced thereabout. The pins 62 are carried by and rigidly secured to the core 51. A relatively heavy coil spring 63 is provided for and encircles each of the pins 62. Said springs have one end abutting the fixed support and the other end abutting the collar 61 and are so constructed and arranged that normally they maintain the collar extended outwardly on the pins 62 whereby said collar is caused to bear against the disc 50, thus centralizing the pointer 60. Means are now provided for disengaging the collar 61 from disc 50 so that relative movement may take place between the pointer and the casing to effect indications and for holding the collar in such disengaged position until an indication has been produced. In the form shown, said means comprise a rod 64 having one end secured to and rotatably mounted in a lug or projection 65 formed on or carried by the collar 61 at right angles thereto and projecting out of the casing though an opening 66, and the other end extending through a supporting sleeve 67 carried by or formed with the casing 45 at the front thereof. A knurled knob 68 is provided on the rod 64 for rotating it and moving it longitudinally outward thereby actuating the collar 61 against the compression of the springs 63. In order to lock the collar in its disengaged position, i. e. when the rod is moved outwardly to the right, the rod 64 is provided with a pin 69 which cooperates with a slot 70 formed in the sleeve 67, as shown, to constitute a bayonet-lock.

It will be seen from the foregoing that when it is desired to have the deviometer indicate, the knob 68 is pulled outwardly to disengage the collar 61 from the rotor element 50 and then rotated clockwise to cause the pin 69 to be locked in the sleeve 67 by virtue of the shape of the slot 70. When it is desired to centralize the pointer of the instrument, the knob 68 is again pulled slightly to bring the pin 69 out of the locked position and then rotated counter-clockwise, whereupon the springs 63 cause the collar 61 to engage the rotor element and thereby causing the pointer to return to its normally central position.

There is thus provided a novel construction of a deviation indicator employing electrical driving means for rotating the gyroscopic element thereof, whereby an instrument is produced which is relatively simple in the number and arrangement of parts, and one which may be easily and economically manufactured without detracting from the efficiency of the instrument.

While only one embodiment of the invention has been illustrated and described, other changes and modifications, which will appear to those skilled in the art, may be made without departing from the scope of the invention. Reference is therefore to be had primarily to the appended claims for a definition of the limits of the invention.

What is claimed is,

1. An aircraft deviation indicator comprising in combination, a plurality of fixed coils providing magnetic fields, a rotatable disc interposed between said coils whereby currents are induced in said disc so that the latter is rotated by the electro-magnetic reaction of the fields produced by the currents in the disc and in the field coils, a universal support for the disc so that relative inclination may take place between the disc and the support about either of two axes perpendicular to each other and to the axis of rotation, all three of said axes being arranged to coincide with the longitudinal, transverse and vertical axes, respectively, of an aircraft on which the indicator is adapted to be mounted, and a pointer projecting from said disc for indicating the relative inclination between the disc and support, which inclination corresponds to the inclination of the aircraft.

2. An aircraft deviation indicator comprising in combination, a plurality of fixed coils providing magnetic fields, a rotor including a rotatable disc interposed between said coils whereby currents are induced in said disc so that the latter is rotated by the electro-magnetic reaction of the fields produced by the currents in the disc and in the field coils, a universal support for the disc so that relative inclination may take place between the disc and the support about either of two axes perpendicular to each other and to the axis of rotation, all three of said axes being arranged to coincide with the longitudinal, transverse and vertical axes, respectively, of an aircraft on which the indicator is adapted to be mounted, a pointer connected to said disc for indicating the relative inclination between the disc and support, which inclination corresponds to the inclination of the aircraft, and means for restoring the disc to its normally central position on the universal support, said restoring means comprising a friction member adapted to engage the disc, and means for actuating said friction member into engagement with said disc.

3. An aircraft deviation indicator comprising an instrument casing having means for mounting it in an opening on a substantially vertical instrument panel so that said casing projects longitudinally back of the panel and the front thereof is substantially in the plane of the panel, three coils mounted in said casing and providing magnetic fields and arranged so that the axes of said coils are substantially parallel to each other and to the longitudinal axis of said casing, one of said coils being spaced longitudinally from the other two coils and the latter two being in substantially the same vertical plane but spaced apart from each other in said plane, a rotatable disc interposed between the third coil and the other two coils and in a plane parallel to the plane of said two coils whereby currents are induced in said disc so that the latter is rotated by the electro-magnetic reaction of the fields produced by the currents in the disc and the currents in the field coils, a universal support for the disc so that relative inclination may take place between the disc and the support about either of two axes perpendicular to each other and to the axis of rotation, the axis of rotation of said disc being coincident with or parallel to the longitudinal axis of an aircraft on which the indicator is adapted to be mounted, and the other two axes about which said disc is adapted to incline being coincident with or parallel to the transverse and vertical axes, respectively, of said aircraft, and a pointer projecting from said disc for indicating the relative inclination between the disc and support, which inclination corresponds to the inclination of the aircraft.

4. An aircraft deviation indicator comprising an instrument casing having means for mounting it in an opening on a substantially vertical instrument panel so that said casing projects longitudinally back of the panel and the front thereof is substantially in the plane of the panel, three coils mounted in said casing and providing magnetic fields and arranged so that the axes of said coils are substantially parallel to each other and to the longitudinal axis of said casing, one of said coils being spaced longitudinally from the other two coils and the latter two being in substantially the same vertical plane but spaced apart from each other in said plane, a rotatable disc interposed between the third coil and the other two coils and in a plane parallel to the plane of said two coils whereby currents are induced in said disc so that the latter is rotated by the electro-magnetic reaction of the fields produced by the currents in the disc and the currents in the field coils, a universal support for the disc so that relative inclination may take place between the disc and the support about either of two axes perpendicular to each other and to the axis of rotation, the axis of rotation of said disc being coincident with or parallel to the longitudinal axis of an aircraft on which the indicator is adapted to be mounted, and the other two axes about which said disc is adapted to incline being coincident with or parallel to the transverse and vertical axes, respectively, of said aircraft, a pointer projecting from said disc for indicating the relative inclination between the disc and support, which inclination corresponds to the inclination of the aircraft, and means for restoring the disc to its normally central position on the universal support, said restoring means comprising a friction member adapted to engage the disc, and means for actuating said friction member into engagement with said disc.

5. A gyroscopic structure comprising a pair of current coils connected in series and wound in opposed relation to provide magnetic poles of opposite polarity, a voltage coil arranged so that the current therein is 90° out of phase with the currents in the current coils and providing a magnetic pole facing the poles of the current coils, and a universally mounted disc constituting the rotor of the gyroscope and interposed between the pole of the voltage coil and the poles of the current coils whereby eddy currents are induced in said disc so that the latter is rotated by the magnetic reaction between the fields produced by the currents in the disc and in the three coils.

CHARLES MARCUS.